United States Patent

Mullins

[15] 3,661,169
[45] *May 9, 1972

[54] LINE CLAMPING SELF-TAPPING SERVICE VALVE

[72] Inventor: John W. Mullins, P.O. Box 20524, Oklahoma City, Okla.

[*] Notice: The portion of the term of this patent subsequent to May 5, 1987, has been disclaimed.

[22] Filed: Apr. 13, 1970

[21] Appl. No.: 27,559

[52] U.S. Cl. ............................................. 137/318
[51] Int. Cl. ........................................... B23b 41/08
[58] Field of Search .......................... 137/317, 318

[56] References Cited

UNITED STATES PATENTS

| | | | |
|---|---|---|---|
| 3,509,905 | 5/1970 | Mullins | 137/318 |
| 2,109,259 | 2/1938 | Yirava | 62/294 |
| 3,162,211 | 12/1964 | Barusch | 137/318 |
| 3,252,475 | 5/1966 | Jones | 137/318 |
| 3,272,211 | 9/1966 | Leopold et al. | 137/318 |

*Primary Examiner*—M. Cary Nelson
*Assistant Examiner*—David R. Matthews
*Attorney*—Robert K. Rhea

[57] ABSTRACT

A U-shaped member straddles a line to be tapped. The legs of the U-shaped member project beyond the line and are transversely drilled for receiving a pin which journals a rectangular block between the legs. Opposing faces of the block are provided with a line receiving recess for use with a plurality of different sizes of lines. The bight portion of the U-shaped member is centrally drilled and threaded perpendicular to the axis of the straddle line for threadedly receiving a centrally bored air valve core equipped housing having a coaxial line piercing core projecting into the line.

2 Claims, 5 Drawing Figures

PATENTED MAY 9 1972 3,661,169

JOHN W. MULLINS
INVENTOR.

BY
Robert K. Rhea
AGENT

LINE CLAMPING SELF-TAPPING SERVICE VALVE

CROSS REFERENCE TO RELATED APPLICATION

The present invention is an improvement over my copending application for Line Clamping Self-Tapping Service Valve, filed Nov. 15, 1967, Ser. No. 683,382.

BACKGROUND OF THE INVENTION

1. Field of the Invention

The present invention relates to a line clamping and self-tapping service valve for refrigerant lines.

Many sealed refrigerating systems are not provided with service valves on the high or low pressure refrigerant conductor line. It is highly desirable to provide a means for ascertaining the amount of refrigerant gas or lack of it contained by the system or to determine on which side of the compressor the trouble lies without disassembling the system.

Most service valves of this class require that the refrigerant gas be removed from a conductor line and the service valve soldered into the line thus necessitating a recharging of the system.

2. Description of the Prior Art

The above copending application is the most pertinent prior art.

The principal distinction between this application and the copending application resides in the simplified manner of forming the line nesting block.

The present invention includes a U-shaped member having a grooved block journaled between its legs which cooperatively receives and nests a portion of a line to be tapped. A valve equipped housing is threadedly inserted through the bight portion of the U-shaped member so that a line tapping core, carried by the valve housing, pierces and seals with the line being tapped.

SUMMARY OF THE INVENTION

A clamp means surrounds a line to be tapped. The clamp means comprises a U-shaped body having its legs loosely straddling the line. The legs of the U-shaped body are transversely drilled, in their end portion projecting beyond the line, for receiving a rectangular block having a V-groove in two of its opposing faces aligned with the axis of the line for nesting a peripheral portion of the line. A pin extends through the bore in the legs of the U-shaped body and through a bore in the block. The bight portion of the U-shaped body is bored and threaded perpendicular to the axis of the line. A centrally bored air valve core equipped housing is threadedly received by the threaded bore in the body. The housing includes a line tapping core coaxially formed on the inwardly directed end of the valve housing which pierces the line as the valve housing is screwed into the body thus completing the clamping action on the line and forming a seal between the line piercing core and the wall of the line. Since the block is provided on two of its opposite faces with V-shaped grooves of respectively different sizes, this line tapping valve may be used on at least four different sizes of refrigerant lines by merely positioning the block so that one of its grooves cooperatively contacts a peripheral portion of the line to be tapped thus eliminating the requirement of a service valve line clamping member for each size line.

The principal object of this invention is to provide a line gripping and self-tapping service valve for connection with any one of a plurality of different sizes of lines which forms a seal with the wall of the tapped line without the use of gaskets, packing, or the like.

DESCRIPTION OF THE PREFERRED EMBODIMENTS

Figure 1:
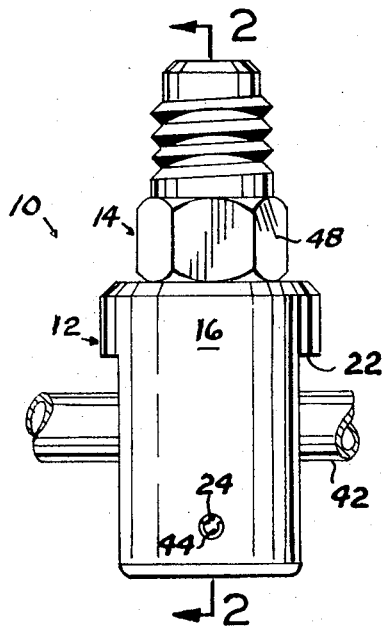
FIG. 1 is a side elevational view of the device installed on a fragment of a line.

Like characters of reference designate like parts in those figures of the drawings in which they occur.

In the drawings:

The reference numeral 10 indicates the device, as a whole, comprising a line clamping means 12 and a valve housing 14. The clamping means 12 comprises a cylindrical-like body 16 bifurcated from one end to form a U-shape having legs 18 and 20 and defining a bight surface 22. Diametrically the body 16 is substantially greater than the largest outside diameter of a line to be tapped. The inner surfaces of the legs 18 and 20 are flat and parallel and the spacing therebetween must be greater than the outside diameter of the largest line to be tapped. Similarly the distance between the bight surface 22 and the free ends of the legs 18 and 20 is substantially greater than the diameter of the largest line to be tapped. The legs 18 and 20 are transversely line drilled, as at 24, for the purposes presently explained.

A substantially rectangular-shaped line gripping block 30, substantially square in transverse cross-section, is provided across each of its respective end faces with opposing right angular or V-shaped grooves 32 and 34. The groove 34 is sufficiently deep to extend the full lateral width of the block while the groove 32 is relatively shallow. The dimensions of the block 30 are such that two of its opposing surfaces 36 and 38 may be slidably received between the opposing inner flat surfaces of the legs 18 and 20. The block 30 is transversely drilled, as at 40, perpendicular to the longitudinal axis of the V-grooves and off-set longitudinally of the block toward the V-shaped groove 34 so that the block 30 may be positioned between the legs 18 and 20 with either one of the grooves 32 or 34 facing toward the bight surface 22. The bottom of each V-shape is thus parallel with the axis of a line to be tapped. When thus positioned with one of the grooves, for example, the groove 32, facing toward the bight surface 22 and contacting a line 42, for example, a one-fourth inch diameter line to be tapped, a pin 44 is extended through the leg bores 24 and the block bore 40 to hold the clamp means 12 on the line 42. As shown more clearly in FIG. 1, the pin 44 is of the split tubular type.

The bight portion of the body 16 is coaxially drilled and threaded, as at 46. The valve housing 14 is provided with a hexagonal head 48 intermediate its ends and one externally threaded end portion 50 which is cooperatively received by the threads 46. The length of the threads 50 is substantially greater than the length of the threads 46 for the purposes presently explained.

The housing is provided with a cone-shaped tip 52 coaxially connected with the end having the threads 50 with the cone-shaped portion angularly truncated, as at 54, to provide a line cutting and piercing tip projecting beyond the threaded end 50. The housing 14 is centrally bored, as at 56, and counter-bored and threaded, as at 58, from its opposite end to provide a seat 60 inwardly of the threads 58 for receiving an air valve core 62 to close the gas passageway formed by the bore 56.

Figure 2:
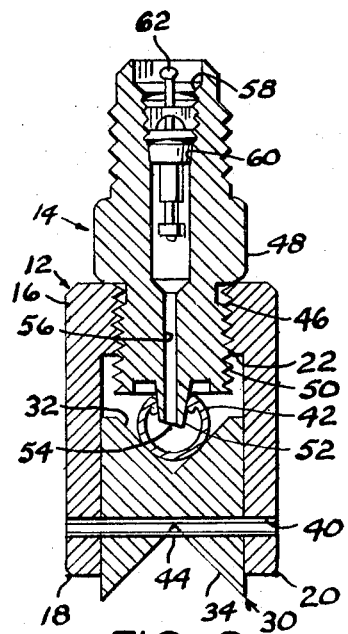
FIG. 2 is a vertical cross-sectional view taken substantially along the line 2—2 of FIG. 1.

As shown by FIG. 2, the housing 14 is screwed into the threads 46 so that the cutting tip 52 enters and pierces the line 42 when the housing head 48 is seated on the end of the body 16 opposite its bight portion 22.

Figure 4:
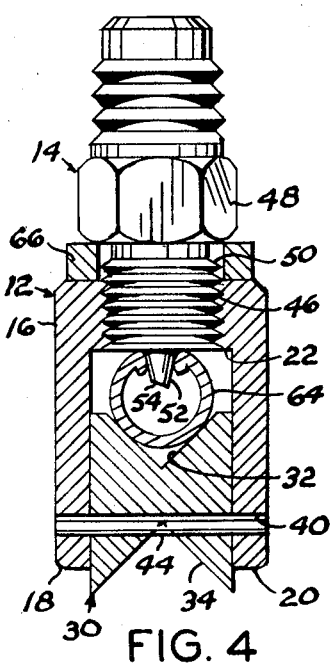
FIG. 4 is a view similar to FIG. 2 illustrating a larger sized line in this V-groove and pierced by the line piercing core; and, FIG. 5 is an elevational view of the V-grooved block in its other line holding position between the clamp legs with the two other sizes of lines to be tapped being shown by superposed dotted lines.
Figure 5:
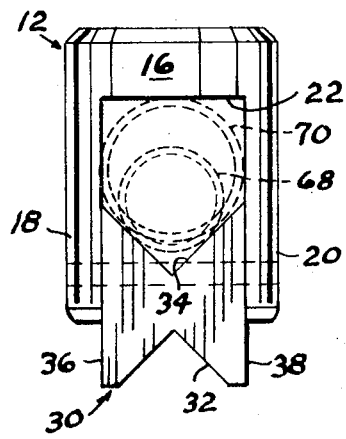
Figure 3:
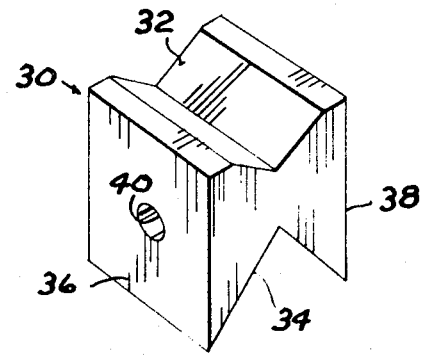
FIG. 3 is a perspective view, to a larger scale, of the V-grooved block forming a part of the line clamping means.

Referring now to FIG. 4, the device is shown installed on a slightly larger size line, for example five-sixteenths inch diameter, indicated at 64, which is similarly nested by the groove 32. For this larger size line a ring 66, having an inside diameter slightly greater than the housing threads 50 and an outside diameter slightly less than the diameter of the body 16, is positioned around the housing threads 50 adjacent the shoulders 48. The housing threads 50 are progressively engaged with the body threads 46 until the line piercing tip 52 pierces the wall of the line 64 while simultaneously the ring 66 is impinged between the housing head 48 and the adjacent end of the body 16. Thus the thickness of the ring 66 is substantially equal to the difference in diameters between the lines 42 and 64 and the purpose of the ring is to prevent screwing the housing threaded end 50 through the body 16 farther than is necessary to pierce the line 64 and crimping or flattening the line 64.

When it is desired to use the clamping means 10 on larger sized diameter lines, for which it is intended, such as three-eighths inch and one-half inch tubing, the block 30 is manually rotated about the axis of the pin 44 so that the V-groove 34 faces toward the bight portion 22. A three-eighths line, indicated by the dotted lines 68, may then be similarly disposed within the V-groove 34 and the housing 14 engaged with the body threads 46 to pierce the line 68 in the manner shown by FIG. 2. Similarly, a half inch diameter line, indicated by the dotted lines 70, may be positioned within the body and V-groove 34 and then, by using the ring 66 around the body threads 50 in the manner shown by FIG. 4, the line 70 may be similarly pierced by the cutting tip 52.

Obviously the invention is susceptible to some changes or alteration without defeating its practicability, and I therefore do not wish to be confined to the preferred embodiment shown in the drawings and described herein.

I claim:

1. A line tapping service valve, comprising:

line clamping means including a substantially U-shaped member having a bight portion and a pair of legs straddling and projecting beyond the line to be tapped, said legs being transversely bored in aligned relation, said bight portion having a threaded bore perpendicular to the axis of the line to be tapped;

a pin extending through the transverse bores in said legs;

a rectangular block transversely fitted between said legs and journaled for rotation about the axis of said pin, said block having a coextensive V-shaped groove in opposing end surfaces, the depth of each said groove being complemental to the outside dimension of a line to be tapped for nesting a peripheral portion of the line and disposing an opposite peripheral portion of the line toward the bight portion of said U-shaped member;

a centrally bored housing having an externally threaded end portion engaging the threaded bore of said bight portion;

a line piercing core coaxially formed on one end of said housing and projecting, at one end portion, beyond said housing and terminating in a sharpened tip end, whereby when said housing is progressively engaged, threadedly, with the threaded bore of said bight portion said sharpened tip end is forced through and seals with the wall of a line to be tapped, said core having a gas passageway communicating with the bore of the tapped line; and, a valve within said housing for opening and closing the gas passageway.

2. Structure as specified in claim 1 and further including:

a ring surrounding the threaded end portion of said housing between said housing head and the adjacent end of said body for limiting the movement of said housing into said bight portion.

* * * * *